United States Patent
Beyer et al.

(10) Patent No.: US 8,931,369 B2
(45) Date of Patent: Jan. 13, 2015

(54) COVER FOR AN APERTURE

(75) Inventors: Thomas Beyer, Cologne (DE); Simon Higgins, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 798 days.

(21) Appl. No.: 12/823,223

(22) Filed: Jun. 25, 2010

(65) Prior Publication Data

US 2011/0017011 A1 Jan. 27, 2011

(30) Foreign Application Priority Data

Jun. 26, 2009 (DE) .......................... 10 2009 030 735

(51) Int. Cl.
| | |
|---|---|
| *G05G 25/04* | (2006.01) |
| *B60K 26/02* | (2006.01) |
| *B60T 7/10* | (2006.01) |
| *B60R 13/08* | (2006.01) |

(52) U.S. Cl.
CPC . *B60T 7/10* (2013.01); *B60K 26/02* (2013.01); *B60R 13/0853* (2013.01)
USPC .......................................................... 74/566

(58) Field of Classification Search
USPC .................... 74/18, 18.1, 508, 523, 557, 566; 403/50; 277/391, 634–636
IPC ..................................... B60T 7/10; F16J 15/52
See application file for complete search history.

(56) References Cited

U.S. PATENT DOCUMENTS

| | | | | | |
|---|---|---|---|---|---|
| 3,285,093 | A | * | 11/1966 | Sellmeyer | ........................ 74/566 |
| 3,954,027 | A | * | 5/1976 | Soderberg et al. | ......... 74/473.36 |
| 5,435,199 | A | * | 7/1995 | Heron et al. | .................... 74/18.1 |
| 5,749,261 | A | * | 5/1998 | Numakami | .................... 74/18.1 |

FOREIGN PATENT DOCUMENTS

| | | | | | |
|---|---|---|---|---|---|
| CN | 2934787 | Y | * | 8/2007 | ............... F16J 15/52 |
| DE | 2932317 | C2 | | 2/1981 | |
| DE | 100247766 | A1 | | 11/2001 | |
| EP | 335129 | A1 | | 10/1989 | |
| GB | 2036198 | A | * | 6/1980 | ............... F16J 15/52 |
| JP | 58177724 | A | * | 10/1983 | ............... F16J 15/52 |
| JP | 60255533 | A | * | 12/1985 | ............... F16J 15/52 |
| JP | 2003276466 | A | * | 9/2003 | ............... F16J 15/52 |
| JP | 2007154986 | A | * | 6/2007 | ............... F16J 15/52 |

* cited by examiner

*Primary Examiner* — Thomas Diaz

(74) *Attorney, Agent, or Firm* — Shook Hardy & Bacon LLP

(57) ABSTRACT

A cover for an aperture in a vehicle wall for a handbrake lever includes various elements. For example, the cover might include an opening region with an opening through which the force-transmitting means can pass and a support region for supporting the cover on the wall. In addition, the opening region might slidably attach to the handbrake lever, such that the opening region slides when the handbrake lever is adjusted. A flexible wall element at least partially attaches over the opening region and the support region, and spring devices are attached to the opening region and the support region to provide tension to the flexible wall element.

9 Claims, 3 Drawing Sheets

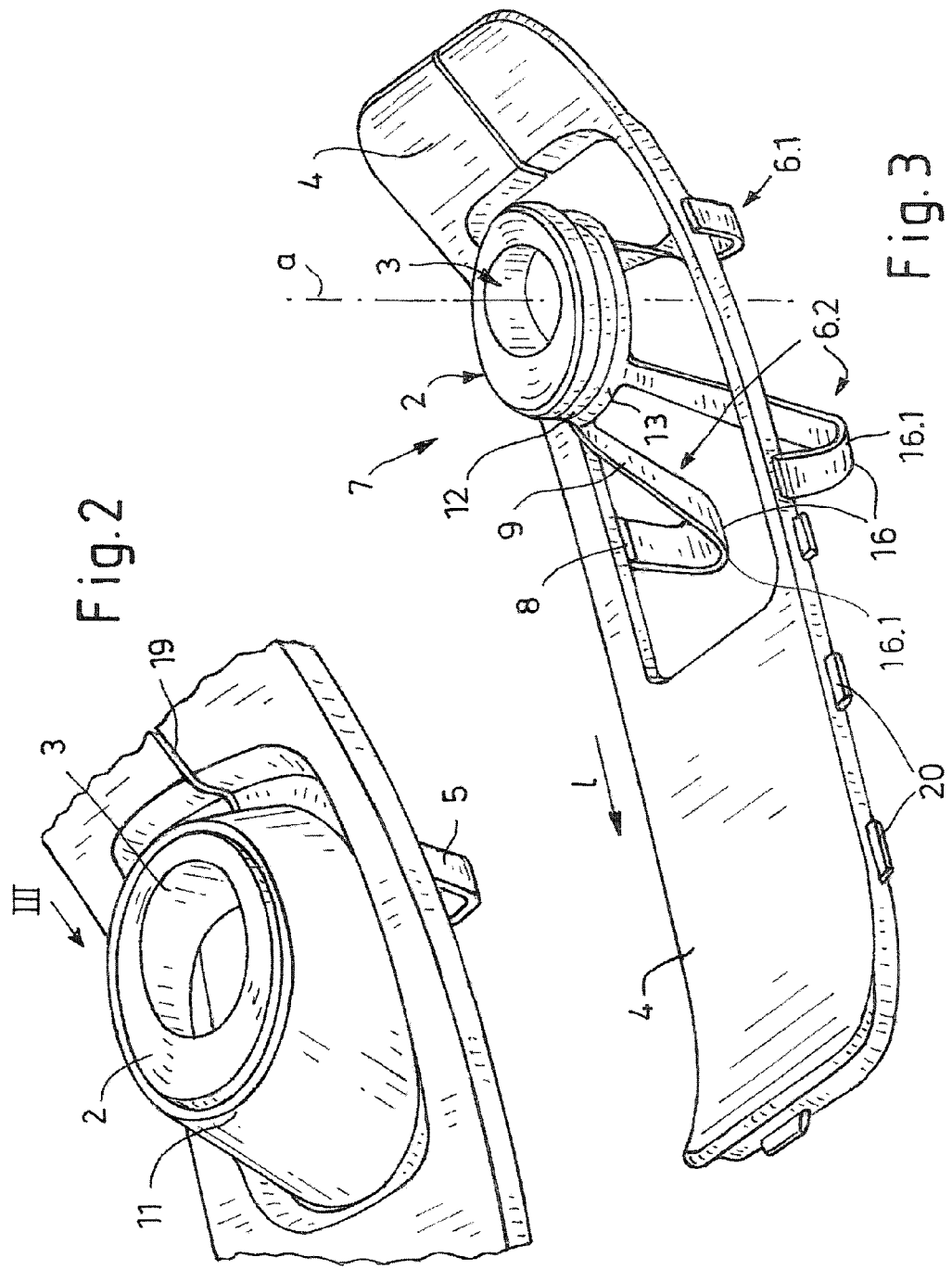

COVER FOR AN APERTURE

TECHNICAL FIELD

The invention relates to a cover for an aperture in a wall, in particular a vehicle wall, for a rod-like force-transmitting means, in particular a handbrake lever, the cover having an opening region with a through-opening through which the force-transmitting means can pass and a support region for supporting the cover on the wall, and the opening region of the cover being able to be coupled to the force-transmitting means in a movement-effecting manner such that its position can be changed with respect to the aperture in order to adapt to a change of position of the actuated force-transmitting means in a plane of movement at least approximately perpendicular to an opening axis of the through-opening.

BACKGROUND OF THE INVENTION

Covers of this type are sufficiently known. A problem with such covers is that a large number of tolerances of cooperating components are present within a complex apparatus such as that of an automobile and that, furthermore, such tolerances differ within finished automobiles. For this reason such apertures must be designed correspondingly large in order to ensure that the force-transmitting means can be operated in the aperture in a functionally reliable manner in all automobiles. The apertures are therefore generally designed larger than the cross section of the force-transmitting means and require a cover. Furthermore, the danger can arise that a user pinches his fingers between, for example, force-transmitting means and vehicle body while actuating the force-transmitting means.

For example, DE 29 32 317 C2 describes a generic cover of complex and costly construction which extends laterally into receiving grooves and is mounted displaceably therein in a plane of movement; however, the danger of pinching continues to be present here.

A complex cover in the form of a flexible gaiter frequently resembling a bellows is also commonly used, for example as described in EP 0 212 664 B1, the opening region being positionally fixed to the force-transmitting means. Although the danger of pinching can be reduced thereby the gaiter is highly stressed, so that the cover has little durability.

DE 100 24 766 A1 proposes a sliding seat of two overlapping parts, the edge of the opening and a cover edge fitting displaceably on the outside of the opening region.

EP 335 129 A1 discloses a simple cover in the form of a flexible bush, the force-transmitting means being guided in a complex and costly manner, for example in the form of a Bowden cable, by a tube which passes through the aperture, so that the movement of the actuated force-transmitting means takes place in a protected manner in the tube.

SUMMARY OF THE INVENTION

It is therefore the object of the invention to make available a cover of the type mentioned in the introduction with which the danger of pinching during actuation of the force-transmitting means is reduced and which is simple in construction.

The object and advantages are achieved according to the invention by the features described hereinafter. The object is achieved, in particular, in that there is provided a flexible wall element which is connected to the opening region and the support region, or is connectable to the opening region and the aperture, and covers at least a gap between support region and through opening in order to provide an at least partially planar cover of the aperture. In addition, the cover has a spring device by means of which the flexible wall element can be tensioned.

By means of the spring device the flexible wall element can be held under tension by spring force between support region and opening region or, in the installed position, between opening region and aperture. The opening region may be held relative to the support region in such a manner that the wall element is always optimally tensioned between support region and opening region or, in the installed position, between opening region and aperture. Furthermore, additional and possibly varying folds in the cover upon actuation of the force-transmitting means, which folds could otherwise induce rupture and/or tearing of the cover, can be at least reduced by the tensioning of the flexible wall element. In the installed position the flexible wall element is effectively connected to the force-transmitting means, with respect to movement of the force-transmitting means in the plane of movement, by means of the opening region or the through-opening. By virtue of the spring device the cover can be automatically adapted to deviations from a prescribed relative position of force-transmitting means and aperture which result from the tolerances present. This can be effected in that the flexible wall element remains permanently tensioned. Moreover, as a result of the tension the shape of the cover can be mechanically stabilized. In the installed position the wall element is preferably arranged on the outside. The flexible wall element may be arranged so that it covers, in particular, locations at which a risk of pinching is present. A plurality of wall elements may also be provided. These may overlap one another.

In the installed position the opening region may be mounted on the force-transmitting means in a movable, in particular slidable, manner in the longitudinal extent of the force-transmitting means. In the event of deflection of the opening region relative to the support region, the spring device may exert a restoring force on the opening region. The opening region can therefore be maintained at least approximately at a given distance from the support region with respect to the opening axis or, in the installed position, with respect to the longitudinal extent of the force-transmitting means. In this case the opening region can be located in a protective position. In the protective position the cover may, for example, be so tensioned or tautened that typical finger traps, such as a gap-like distance between force-transmitting means and vehicle wall in the region of the aperture, or corrugations of a flexible gaiter provided, are covered and therefore placed outside the region to which the user's fingers have access. The design of the protective position may be so adjusted that in this position especially hazardous regions of the aperture in its interaction with the force-transmitting means are inaccessible through the cover. In the protective position a maximum distance from the through-opening to the support region may also be established. The spring device may exert on the opening region a restoring force in the direction of the protective position in the event of deflection of the opening region from the protective position relative to the support region. As a result of the displaceable mounting of the opening section on the force-transmitting means, the distance from the through-opening to the support region, and therefore to the aperture, can be permanently optimized in relation to the protective position, that is, can be at least approximated to the protective position.

The spring device is preferably designed such that it can exert on the opening region a spring force in the plane of movement and perpendicular thereto. As a result of the displaceable mounting of the opening region on the force-transmitting means, the relative positions of opening region and support region with respect to one another in the longitudinal extent of the force-transmitting means can be automatically optimized, in relation to the predefined or set protective position, by means of the spring device. It can thereby be ensured that the protective position is not departed from more than is absolutely necessary for design reasons.

The tensioning of the cover by means of the spring device may serve as a special design feature.

For easy entrainment of the opening region, the cross-sectional area of the opening of the through-opening may be at least approximately adapted to the cross-section of the force-transmitting means. For easy displaceability, sufficiently large play may be provided between the force-transmitting means and the through-opening with respect to the plane of movement. In addition, friction-reducing constructional arrangements may be made on the inside of the through-opening and/or on the force-transmitting means, such that, for example, at least one of the surfaces sliding on one another is smoothed and/or a friction-reducing layer or coating is provided. In the installed position, the opening region may be connected nonpositively, preferably positively, to the force-transmitting means with respect to the plane of movement. It may be provided that a displacement travel of the opening region on the force-transmitting means is limited by means of preferably adjustable stops, which are preferably arranged on the force-transmitting means.

The cover may be fastened to the wall by means of the support region. Preferably, the support region can be snap-fitted to the wall or to the aperture.

The cover preferably has a support body with opening region and support region. The spring device may be integrated in the support body. The spring device can therefore be produced together with the support body and supplied and installed as a module.

The spring device may include spring elements which are each connected nonpositively and/or positively to the support region by means of an end configured as a support end, and/or are connected non-positively and/or positively to the opening region by means of an end configured as a force-applying end. The spring elements may at least partially form the opening region by means of their force-applying ends. In the installed position, therefore, the spring elements may apply a spring force to the force-transmitting means either indirectly via the opening region or directly, if they at least partially form the opening region. Some spring elements may apply a spring force to the force-transmitting means indirectly, via the opening region, others directly. At least one of the spring elements may be firmly fastened to the wall element in at least one location. The wall element may therefore be supported on the spring element. The outer contour of the wall element may be shaped by means of this spring element, a hazardous location on the aperture, for example, being bridged. Preferably at least a row of the spring elements is firmly fastened to the wall element.

The spring element or elements may have an elongated configuration and may be firmly connected to the wall element over their longitudinal extent. The spring elements may thereby support the wall element in the manner of ribs.

The spring elements may be individual components made of plastics material or of metal, preferably spring steel. The spring elements may be fixed by means of a snap-in connection, by means of bonding or by means of form-fitting adaptation, for example using partial softening of the plastics material of the support body, or they may be fastened resiliently, to the support body. As types of springs, all those by means of which the flexible wall element can be maintained under tension, in particular those by means of which the desired spring force can be applied to the opening region, are ultimately possible. Preferably, the spring elements are integrated in the support body by a material joint. The spring elements may be made from a plastics material for springs. For this purpose the support body may be produced using the two-component injection molding process, with one plastics material for the support region and the opening region and a different plastics material for the spring elements.

In order to apply a three-dimensionally equal spring force to the opening region or, in the installed position, to the force-transmitting means, the spring elements may be arranged in a circumferentially spaced, preferably equidistant, manner from one another with respect to the through-opening. Preferably, the spring elements each apply an equal radial spring force component to the opening region or, in the installed position, to the force-transmitting means. A symmetrical application of spring force is thereby possible.

The force-applying ends of the spring elements may be twisted with respect to their respective support ends through a torsion angle greater than zero degrees. This may be advantageous, in particular in the case of elongated spring elements such as leaf springs, because the spring elements can be stabilized mechanically within themselves and relative to one another as a result of improved stiffness. In addition, the spring force may contain a corresponding torsional moment and usefully cancel that applied to the opening region through the interaction of the spring elements, while at the same time tensioning and thereby positionally stabilizing the opening region. An optimum torsion angle depends on design factors and requirements. It may amount to a plurality of turns, that is, a multiple of 360°. Preferably, the torsion angle is at least 30°, preferably at least 60° or ideally at least 90°.

In a configuration of the cover, the spring elements may be in the form of spring tongues. These may be delimited laterally by means of incisions. The incisions may extend from the through-opening at least approximately radially outwards. In this configuration of the spring elements the through-opening may be directly delimited, at least partially, by the spring elements.

In a preferred configuration of the cover, the spring elements may be in the form of elongated, in particular strip-shaped leaf spring elements. They may have an approximately U-shaped form with two arms, a first arm comprising the force-applying end and a second arm the support end. The arms may extend, at least with a main component of extent, at least approximately in the direction of the opening axis or at least approximately perpendicularly to the plane of movement.

The opening region may have an annular configuration. The opening region may be produced as a hollow-cylindrical section delimiting the through-opening. In the installed position the spring elements preferably engage on a lower half of the hollow-cylindrical section oriented towards the aperture, preferably radially on the outside of the lower end face thereof.

The gaps between the spaced spring elements may each be filled by means of the flexible wall element. In the protective position the wall element may be tensioned in a planar manner between the respective associated spring elements. Some or all of the gaps may be covered by means of a single planar wall element. Preferably, the wall element or wall elements is/are connected or bonded to the spring elements, preferably to their force-applying ends and/or support ends, preferably by a material joint. Preferably, the support body, preferably including the wall element or wall elements, is formed in one piece.

In a preferred configuration of the cover, the flexible wall element is in the form of a gaiter. As already described above, the wall element or gaiter may be maintained under tension by means of the spring device. In the protective position it may be maintained under tension in such a manner that it is stretched smooth towards the outside in the installed position. The wall element or gaiter may be connected, in particular bonded, preferably partially, to the support body. In a preferred configuration the gaiter is connected, in particular bonded, at least partially or at a plurality of locations, to the opening region and to the support region, at least over a narrow section which is circumferential with respect to the through-opening. Preferably, the gaiter is connected, in particular bonded, via said section to the opening region and to the support region over its full periphery. The cover can thereby be completely prefabricated and inserted as a module during assembly. The wall element or the gaiter covers the support body preferably completely, apart from the side of the opening region configured as the upper face and oriented away from the aperture in the installed position. The wall element may extend laterally around the support body with an edge extending preferably over its entire periphery.

The support body and the wall element or the gaiter are preferably configured as a single one-piece component or are each configured respectively as one-piece components. In particular, the support body and the flexible wall element or the gaiter may be configured as a one-piece injection molding, or may each be configured respectively as one-piece injection moldings.

The gaiter and the support body are preferably produced using a multi-component injection molding process, in which case the support body may preferably be produced from a different plastics material than the gaiter. The plastics material of the support body preferably has higher stability than that of the gaiter. The plastics material of the gaiter may in turn be more flexible than that of the support body. The preferred material is in all cases plastics material.

For lateral insertion of the force-transmitting means into the through-opening there may be provided a lateral slot which extends from the outer contour up to the through-opening. The slot is preferably so configured that its slot edges can be spaced far enough from one another in the non-installed position that the force-transmitting means can be inserted into the through-opening laterally, or at least approximately perpendicularly to the opening axis. In the installed position the slot edges may be able to be brought together in such a manner that they abut directly on one another. The slot can therefore appear in the installed position simply as mutually abutting molding edges. The slot preferably extends to the through-opening in a direction of extent which in the installed position is oriented in the direction of travel of the vehicle. The slot from the through-opening to the outer contour of the cover is preferably oriented against the direction of travel.

The cover may be snap-fitted to the aperture. For this purpose lateral snap-in means which engage in the inner side of the aperture may be provided. The snap-in means may be snap-in projections which may be spaced circumferentially with respect to the opening axis and preferably arranged laterally with respect to the support end.

BRIEF DESCRIPTION OF THE DRAWINGS

The present invention is explained in more detail below with the aid of two embodiments represented in a drawing, in which:

FIG. 2 is a perspective top view of a detail III of the first embodiment of the cover with the opening region, FIG. 3 is a perspective top view of the support body of the first embodiment of the cover and FIG. 4 is a perspective top view of a second embodiment of the cover.

DETAILED DESCRIPTION OF THE PREFERRED EMBODIMENTS

Figure 1:
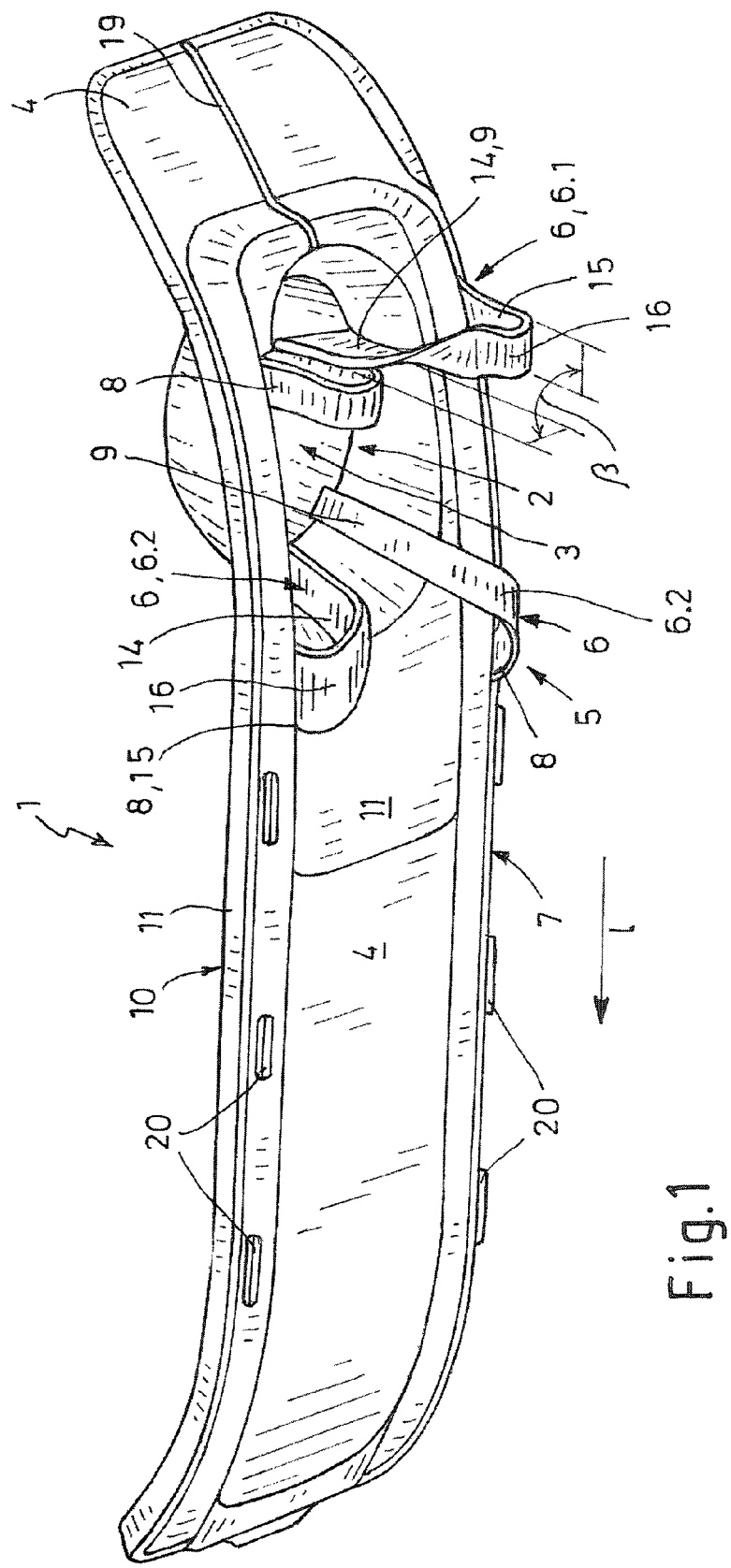
FIG. 1 is a perspective view from below of a first embodiment of a cover with an opening region of a support body having a through-opening for a force-transmitting means (not shown here)

In the attached figure the same reference numerals will be used to refer to the same components. In the following description various operating parameters and components are described for different constructed embodiments. These specific parameters and components are included as examples and are not meant to be limiting.

FIGS. 1 to 4 show two embodiments of a cover 1 for an aperture (not shown here) in a wall (not shown), in particular a vehicle wall, for a rod-like force-transmitting means (not shown), in particular a handbrake lever. The cover 1 has respectively an opening region 2 with a through-opening 3 through which the force-transmitting means can pass and a support region 4 for supporting the cover 1 on the wall. The opening region 2 of the cover 1 is configured in such a manner that, to adapt to a change of position of the actuated force-transmitting means at least in a plane of movement at least approximately perpendicular to an opening axis a of the through-opening 1, the position of said opening region 2 can be changed with respect to the support region 4 or, in the installed position in the aperture (not shown here), with respect to the aperture. The opening region 2 of the cover 1 can be coupled to the force-transmitting means in a movement-effecting manner with respect to the plane of movement. For this purpose the cross section of the opening of the through-opening 3 is adapted to the cross section of the force-transmitting means (not shown here) in such a manner that the opening region 2 rests slidably against the side of the force-transmitting means in the installed position. The opening region 2 is thereby moved by actuation of the force-transmitting means in the plane of movement perpendicular to the opening axis a, while the opening region 2 slides along the force-transmitting means when the force-transmitting means is moved in the direction of the opening axis a.

Figure 4:
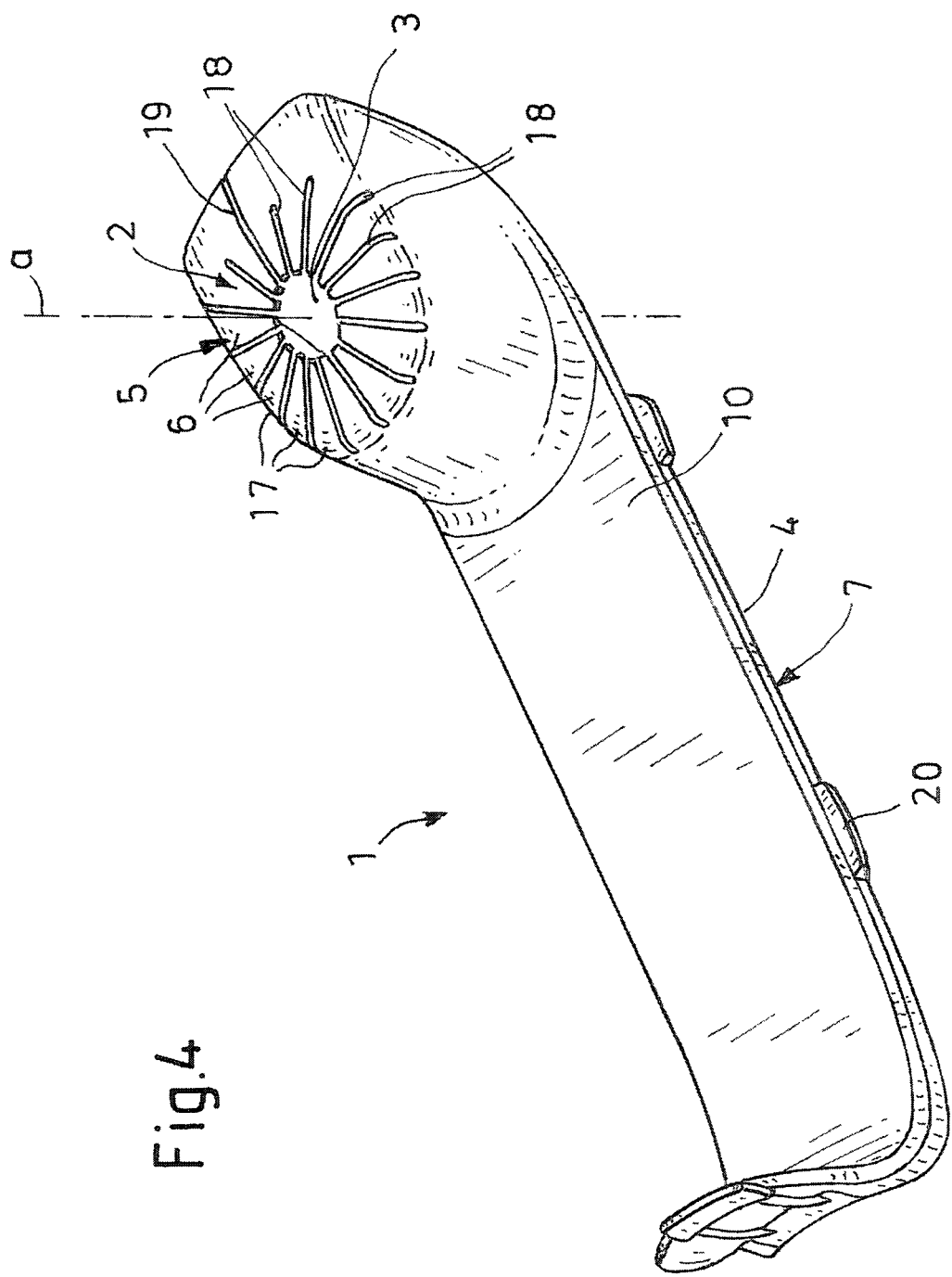

Support region 4 and opening region 2 or through-opening 3 are spaced apart from one another in a protective position shown in FIGS. 1, 2 and 4. For this purpose there is provided a spring device 5 with spring elements 6 by means of which the opening region 2 is held with respect to the support region 4. The spring device 5, the opening region 2 and the support region 4 form a support body 7. The spring device 5 is therefore integrated in the support body 7. The support body 7 is here a one-piece plastics injection molding. The support body 7 is shown in an individual representation in FIG. 3. It is clearly apparent from this figure that spring elements 6 engage with the opening region 2 in the manner of legs and hold it in a plane above the support region.

The spring elements 6 are each connected by a material joint to the support region 4 by means of an end configured as a support end 8. In addition, the spring elements 6 are spaced from one another around the circumference of the through-opening 3. In the first embodiment of the cover 1 as shown in FIGS. 1 to 3, the spring elements 6 are connected by a material joint to the opening region 2 by means of an end configured as a force-applying end. The spring elements 6 therefore engage indirectly on the force-transmitting means in the installed position. In deviation therefrom, the spring elements 6 in the second embodiment of the cover 1, as shown in FIG. 4, form the opening region 2 and delimit the through-opening 3 therein by means of their force-applying ends 9. In the installed position, therefore, the spring elements 6 engage directly on the force-transmitting means. In both cases, in the event of deflection of the spring elements 6, a restoring force is exerted on the opening region 2.

In addition, the cover 1 has a flexible, planar wall element 10 which completely covers the support body 7 from above, apart from the upper face of the opening region 2. In the first embodiment of the cover 1 the wall element 10 is in the form of a gaiter 11 which is fixed, in the present case bonded, to the opening region 2 and to the support region 4. Here, the opening region 2 has a hollow-cylindrical shape with a cylindrical surface as a receptacle 12 with a receptacle stop 13. In order to assemble the cover 1, the gaiter 11 is pulled over the outer receptacle 12 in such a manner that it rests in a planar and circumferential manner against the receptacle 12 and, in its correct positioning, rests with its underside against the receptacle stop 13 which is oriented radially outwards. In addition, the gaiter 11 rests with its upper side against the support region 4. The fixing of the gaiter 11 to the support body 7 is effected with pretensioning of the spring elements 6. By means of the pretensioning the flexible gaiter 11 is maintained in a correspondingly tensioned or tautened state. The cover 1 is thus in a protective position in which, in the installed position, it completely covers the aperture apart from the part of the opening region 2, without having so-called finger traps for pinching the fingers of the user (not shown here). If the opening region 2 is deflected relative to the support region 4 in the direction of the opening axis a and/or perpendicularly thereto, the spring elements 6 exert on the opening region 2 a restoring force back to the protective position in the installed position with statically fixed support region 4.

In the first embodiment of the cover 1 the spring elements 6 are in the form of elongated, approximately U-shaped leaf spring elements with two arms, a first arm 14 and a second arm 15, and a deflection region 16 connecting them. The first arm 14 has the force-applying end 9; the second arm 15 includes the support end 8. Both arms 14, 15 extend approximately in the direction of the opening axis a.

The force-applying ends 9 of the spring elements 6 are twisted with respect to their respective support ends 7 through a torsion angle β greater than zero. In the first embodiment of the cover 1 four spring elements 6 engage on the opening region 2, two each of which cooperate as pairs and are arranged with respect to one another in a mirror-symmetrical structure with respect to a longitudinal section plane containing the opening axis a. Two first spring elements 6.1 are arranged on the right in FIGS. 1 and 3 and two second spring elements 6.2 are arranged on the left in FIGS. 1 and 3. A corresponding symmetrical spring force is thereby exerted on the opening region 2. The first spring elements 6.1 have a torsion angle β of 90°. The twisting of the spring elements 6.1 generally increases their stiffness and their restoring force to the protective position. In addition, the mirror-symmetrical arrangement of the spring elements 6.1, 6.2 produces a tensioning of the spring elements 6.1, 6.2 against the support region 4 and the opening region 2. Because the second embodiment of the cover 1 is designed for a brake lever (not shown here) which is movable for actuation through the through-opening 3 substantially in the direction of the opening axis a, the arms 14, 15 of the second spring elements 6.2 are arranged spaced apart from one another in the longitudinal direction I of the cover 1 in order to be able to absorb in a mechanically advantageous manner a force to be expected in the direction of the opening axis a.

In deviation from the support body 7 according to FIG. 1, the deflection region 16 of the spring elements 6.2 is in each case configured as a connecting part 16.1 into which the ends of the arms 15 are inserted and bonded. In order to increase the stiffness of the spring elements 6.2 the connecting part 16.1 is made of a plastics material of increased stability or of metal. The support body 7 can thereby be adapted to specific requirements in that, for example, certain spring stiffnesses of the spring elements 6.2 are adjusted and opening regions 2 and support regions 4 of different dimensions are combined with one another.

In the second embodiment of the cover 1 the spring elements 6 are configured as spring tongues 17 which are delimited laterally by means of incisions 18. The incisions 18 extend at least approximately radially outwards from the through-opening 3, and radially on the inside delimit the through-opening 3. In this embodiment of the cover 1, support body 7 and wall element 10 are connected in a planar manner to form a unit.

For lateral insertion of the force-transmitting means into the through-opening 3 there is provided in the cover 1 a lateral slot 19 which extends in the longitudinal direction I from the outer contour of the cover 1 up to the through-opening 3.

In both embodiments lateral snap-in projections 20 are provided in order to form a snap-in connection, by means of which projections 20 the cover 1 can be snap-fitted into a seating by means of locking means provided therein.

LIST OF REFERENCES

1 Cover
2 Opening region
3 Through-opening
4 Support region
5 Spring device
6 Spring element
6.1 First spring element
6.2 Second spring element
7 Support body
8 Support end
9 Force-applying end
10 Wall element
11 Gaiter
12 Receptacle
13 Receptacle stop
14 First arm
15 Second arm
16 Deflection region
16.1 Connecting part
17 Spring tongue
18 Incision
19 Slot
20 Snap-in projection
a Opening axis
I Longitudinal direction
β Torsion angle

The invention claimed is:

1. A cover for an aperture in a vehicle wall, for a handbrake lever, the cover comprising;
a support region having an aperture;
spring elements that are attached at a respective first end to the support region and that extend through the aperture, wherein the spring elements each include a first leg attached to the support region, a second leg, and a deflection region that connects the first leg to the second leg and wherein each spring element is twisted through a torsion angle such that the first leg and the second leg are twisted with respect to one another;

a cylindrical ring portion attached to respective second legs of the spring elements; and a flexible wall element that is affixed to an outside surface of the cylindrical ring portion and that covers an upper surface of the support region.

2. The cover as claimed in claim 1, wherein the cylindrical ring portion is slidably mounted onto the handbrake lever and wherein the spring elements exert a restoring force on the cylindrical ring portion upon deflection of the cylindrical ring portion relative to the support region.

3. The cover as claimed in claim 1, wherein the spring elements are arranged circumferentially with respect to the cylindrical ring portion and spaced apart from one another.

4. The cover as claimed in claim 1, wherein the torsion angle is greater than thirty degrees.

5. The cover as claimed in claim 1, wherein the deflection region includes a U-shaped bend.

6. The cover as claimed in claim 1, wherein the support region includes a slot for attaching the cover onto the handbrake lever.

7. The cover as claimed in claim 1, wherein the flexible wall element includes a gaiter which substantially covers the support region and the cylindrical ring portion in the installed position.

8. The cover as claimed in claim 7, wherein the gaiter is bonded to the outside surface of the cylindrical ring portion.

9. A cover for a rod-like force-transmitter comprising:

a support region having and underside and an opening through which the rod-like force-transmitter extends;

spring elements each having a first leg, a second leg, and a deflection region connecting the first leg to the second leg, wherein the first leg is attached to the underside of said support region and wherein each spring element is twisted through a torsional angle, such that the first leg and the second leg are twisted with respect to one another;

a ring element attached to respective second legs of the spring elements and slidably attached to the rod-like force-transmitter; and a flexible wall element bonded to an outward-facing surface of the ring element and covering a top side of the support region that opposes the underside.

* * * * *